UNITED STATES PATENT OFFICE.

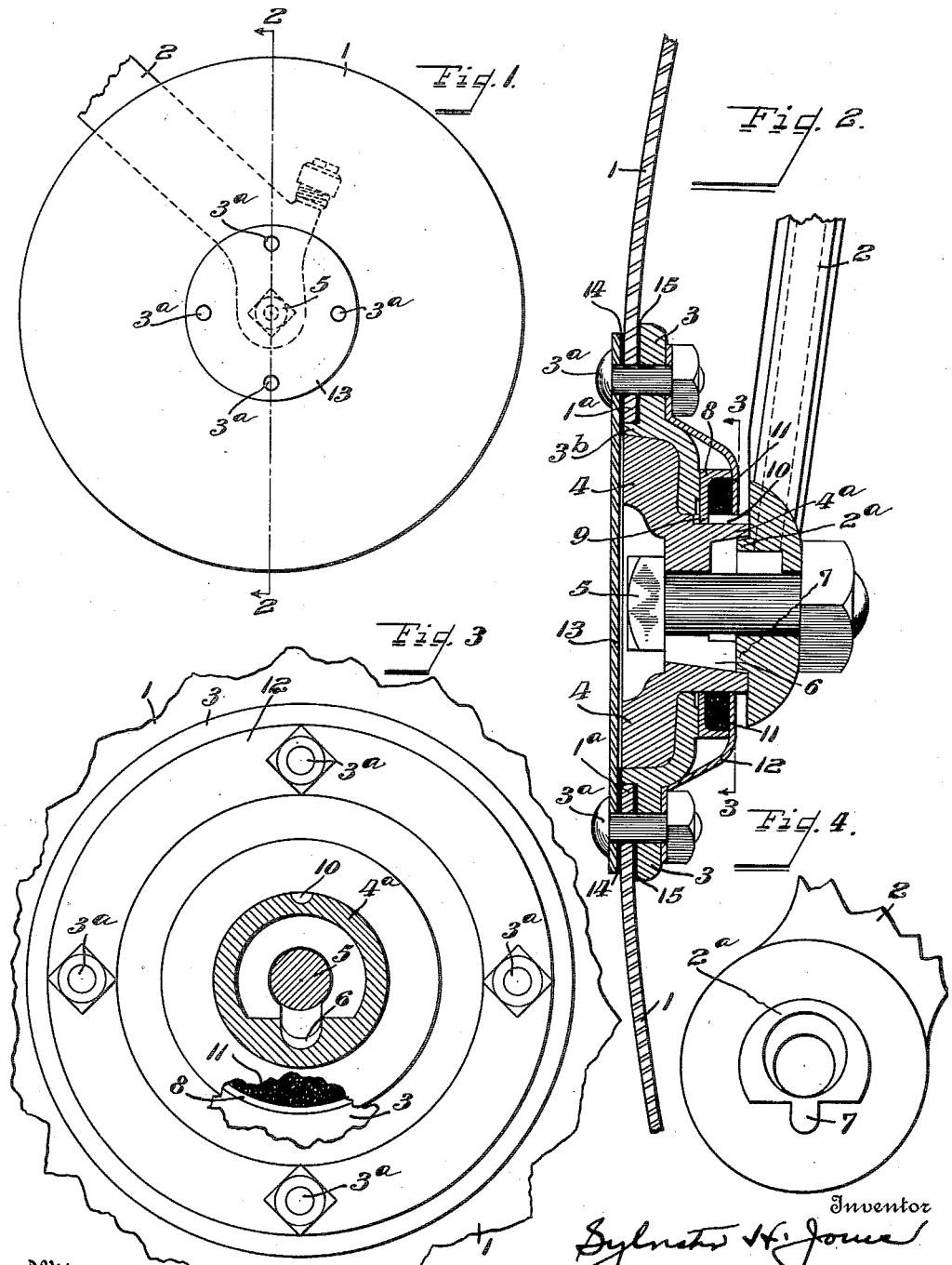

SYLVESTER H. JONES, OF RICHMOND, INDIANA, ASSIGNOR TO THE AMERICAN SEEDING MACHINE COMPANY, OF SPRINGFIELD, OHIO, A CORPORATION OF OHIO.

BEARING.

1,082,084.      Specification of Letters Patent.      Patented Dec. 23, 1913.

Application filed October 11, 1912. Serial No. 725,160.

*To all whom it may concern:*

Be it known that I, SYLVESTER H. JONES, a citizen of the United States, residing at Richmond, in the county of Wayne and State of Indiana, have invented certain new and useful Improvements in Bearings, of which the following is a specification.

This invention relates to improvements in bearings and more particularly to bearings specially adapted for disk furrow-openers for seeding machines.

An object of the invention is to provide effective means for excluding dirt from the bearings by the employment of a felt washer so arranged that there will be a minimum amount of wear upon the washer.

A further object of the invention is to provide, in a disk furrow-opener in which the disk is of the open center type, a removable wearing plate for the opening in the disk so constructed that it may be reversed after the wearing side has become worn.

A further object of the invention is to simplify and make more effective the operation of bearings of this type.

In accompanying drawings Figure 1 is a side elevation of so much of a furrow-opening device as is necessary to illustrate this invention, looking at the convex side of the disk. Fig. 2 is an enlarged vertical sectional view of the same on the line 2—2 of Fig. 1. Fig. 3 is a section on the line 3—3 of Fig. 2. Fig. 4 is a detail view of the lower portion of the inside of the support.

Like parts are represented by similar characters of reference in the several views.

In the said drawing, 1 represents a disk of the usual concavo-convex form, provided with an open center; 2 is a support in the nature of a hanger to which the usual drag-bar (not shown) may be attached in any suitable manner. Connected to the disk about the central opening thereof by the bolts 3ª is a housing 3 of the usual construction which receives the bearing block 4, which bearing block is of the same form as those heretofore used in devices of this character, and is connected to the support 2 by a bolt 5; said bearing block being provided with a recess 6 to receive a projection 7 on the boss 2ª of the support to hold the same against rotation.

The bearing block 4 is provided with a reduced portion 4ª which projects through a central opening in the housing 3 and beyond the same for a suitable distance, the outer end of said reduced portion being fitted over the said boss 2ª of the support. Located upon this reduced portion 4ª is a circular hardened flat-faced ring or casing 8, disposed against the outside of the housing; this casing being held against rotation by a projection 9 thereon which extends into a recess 10 in the reduced portion of the bearing block. This casing 8 is formed open on its inner periphery and outer side and located therein is a felt washer 11. Secured to the housing by the same bolts 3ª which secure the housing is a pressed steel cap 12, formed with an open center which fits snugly about the reduced portion 4ª of the bearing block and which lies closely adjacent to the felt washer 11.

In prior devices which employ felt washers for excluding the dirt, the construction has been such that the washer either is rotated upon or rotates against a more or less roughened casing which soon wears the felt washer and causes it to roll up in knots and lumps.

In the construction just described it will be seen that the washer is fully protected upon its outer and inner peripheries and inner side by a non-rotating cap 8 and reduced portion 4ª of the bearing block and that the only point where it is exposed to wear is where it is in contact with the pressed steel cap 12, which, having a surface which is smooth in its character, will not have that tendency to damage the felt as in other prior structures.

As before stated, the disk 1 is provided with an open center and this open center is closed by the circular wearing plate 13, also attached to the disk by the securing bolts 3ª; the wearing plate being designed to take the wear occasioned by the end thrust of the disk against the bearing block so as to save wear upon the disk at this point and obviate the necessity of renewal of the entire disk from this cause. To this end, it will be seen that the bearing block extends through the central opening in the disk and to a point substantially flush with the convex side of the disk, and in close proximity to the plate. This plate 13 is formed flat, and the portion 1ª of the disk immediately surrounding the opening therein and against which the cover plate lies, is likewise flattened. The housing 3 is preferably provided with a circular laterally extending flange 3ᵇ which is fitted to the circular opening of the disk about the bearing block, and against which the plate 13 is also adapted to lie. Packing in the nature of thin washers 14 and 15 of any suitable material, but preferably asbestos fiber, are interposed respectively between the disk and the plate 13 and housing 3, to exclude dirt at these points. Owing to the flat nature of the plate 13 and the central portion of the disk, it will be seen that when the inside of the plate 13 becomes worn to any appreciable extent, it may be readily reversed.

Having thus described my invention, I claim:—

1. In a bearing, a fixed bearing block, a rotatable member, a housing carried by said member journaled on said block, a flexible washer fitted to said block, a wearing ring between said flexible washer and the outside of said housing, means for holding said ring and washer against rotation, and a cap carried by said member and in frictional engagement with the exposed side of said flexible washer.

2. In a bearing, a fixed bearing block having a reduced portion, a rotatable member, a housing carried by said member journaled upon said block, a flexible washer fitted to the reduced portion of said block on the outside of said housing, a wearing ring encircling said reduced portion of the block between said flexible washer and the outside of said housing, means for holding said ring and washer against rotation, and a cap carried by said member and encircling said reduced portion of said block and in frictional engagement with the exposed side of said washer.

3. In a bearing, a fixed bearing block, a rotatable member, a housing carried by said member journaled on said block, a flexible washer on said block on the outside of said housing, a wearing ring between said flexible washer and housing and formed to embrace the outer periphery of said washer, means for holding said ring and washer against rotation on said block, and a cap also carried by said member in frictional engagement with the exposed side of said washer.

In testimony whereof, I have hereunto set my hand this 5th day of October, 1912.

SYLVESTER H. JONES.

Witnesses:
    FRED J. CARR,
    E. G. BUEKER.